(12) United States Patent
Li et al.

(10) Patent No.: US 10,697,162 B2
(45) Date of Patent: Jun. 30, 2020

(54) FLOW SELF-ADJUSTING FAUCET AERATOR

(71) Applicants: Xiamen Lota International Co., Ltd., Xiamen, Fujian (CN); Lota Xiamen Industry Co., Ltd., Xiamen, Fujian (CN)

(72) Inventors: Keping Li, Xiamen (CN); Jinqing Ye, Xiamen (CN); Chuanbao Zhu, Xiamen (CN)

(73) Assignees: XIAMEN LOTA INTERNATIONAL CO., LTD., Xiamen, Fujian (CN); LOTA XIAMEN INDUSTRY CO., LTD., Xiamen, Fujian (CN)

( * ) Notice: Subject to any disclaimer, the term of this patent is extended or adjusted under 35 U.S.C. 154(b) by 66 days.

(21) Appl. No.: 16/055,141

(22) Filed: Aug. 5, 2018

(65) Prior Publication Data

US 2019/0368176 A1    Dec. 5, 2019

(30) Foreign Application Priority Data

May 29, 2018   (CN) .......................... 2018 1 0529798

(51) Int. Cl.
| E03C 1/084 | (2006.01) |
| B05B 1/30 | (2006.01) |
| B05B 7/04 | (2006.01) |
| E03C 1/04 | (2006.01) |
| G05D 7/01 | (2006.01) |

(52) U.S. Cl.
CPC ............ *E03C 1/084* (2013.01); *B05B 1/3006* (2013.01); *B05B 7/0425* (2013.01); *E03C 1/0404* (2013.01); *G05D 7/012* (2013.01)

(58) Field of Classification Search
CPC ....... G05D 7/012; E03C 1/084; E03C 1/0404; E03C 1/08–086; B05B 1/3006; B05B 7/0425
USPC ...... 239/428.5, 398, 401, 407, 443; 137/504
See application file for complete search history.

(56) References Cited

U.S. PATENT DOCUMENTS

| 3,684,191 | A  | * | 8/1972 | Shames .................... E03C 1/084 239/428.5 |
| 5,899,224 | A  | * | 5/1999 | Moldenhauer ........... B67D 7/36 137/513.3 |
| 9,205,436 | B2 | * | 12/2015 | Zhou ..................... B05B 7/0425 |
| 2013/0134235 | A1 | * | 5/2013 | Blum ...................... E03C 1/084 239/428.5 |
| 2017/0087563 | A1 | * | 3/2017 | Lin ........................ F16K 11/044 |
| 2018/0179742 | A1 | * | 6/2018 | Yuan ................. F16K 31/52491 |

* cited by examiner

*Primary Examiner* — Cody J Lieuwen
*Assistant Examiner* — Sagar N Patel
(74) *Attorney, Agent, or Firm* — Leong C. Lei

(57) ABSTRACT

A flow self-adjusting faucet aerator includes an aerator unit. Upper and lower ends of the aerator unit have a water inlet and a water outlet, respectively. A flow regulator is fitted in the water inlet of the aerator unit. The flow regulator can automatically adjust the discharge area according to the change of the water pressure of the influent water flow to maintain the stability of the water outflow.

11 Claims, 3 Drawing Sheets

FLOW SELF-ADJUSTING FAUCET AERATOR

BACKGROUND OF THE INVENTION

1. Field of the Invention

The present invention relates to a faucet aerator, and more particularly to a flow self-adjusting faucet aerator.

2. Description of the Prior Art

Most of faucets, shower heads, and the like are provided with a faucet aerator that can be simply screwed onto the faucet head, creating a non-splashing stream and often delivering a mixture of water and air. However, conventional aerators generally do not have a flow adjustment function. Therefore, under different water pressures, the water outflow varies greatly. If the water pressure is too high, the water outflow becomes too large to cause inconvenience in use or waste of water resources.

Accordingly, the inventor of the present invention has devoted himself based on his many years of practical experiences to solve these problems.

SUMMARY OF THE INVENTION

The primary object of the present invention is to provide a flow self-adjusting faucet aerator which can be automatically adjusted according to the change of the water pressure of the influent water flow to maintain the stability of the water outflow.

In order to achieve the aforesaid object, the flow self-adjusting faucet aerator of the present invention comprises an aerator unit. Upper and lower ends of the aerator unit have a water inlet and a water outlet, respectively. A flow regulator is fitted in the water inlet of the aerator unit. The flow regulator includes a base, an adjustment member, and an upper cover. The base is fitted in the water inlet. The base is provided with a mounting trough that is recessed downwardly. An influent hole is provided in a center of the mounting trough. The adjustment member includes an elastic plate that abuts against a bottom of the mounting trough and at least two ribs that are disposed on an upper end surface of the elastic plate and spaced apart from each other. A center of the elastic plate is provided with a through hole facing the influent hole. A lower end surface of the elastic plate is provided with deformation troughs that are recessed upwardly and correspond to the respective ribs. The upper cover is movably fitted in the mounting trough and in contact with the ribs. The upper cover is provided with a plurality of water inlet holes. Between every adjacent two of the ribs in cooperation with the upper cover and the elastic plate is formed with a water chamber communicating with the water inlet holes. Between inner ends of the ribs at two sides of the water chamber in cooperation with the upper cover and the elastic plate is formed with a water opening communicating with the water chamber and the influent hole.

Preferably, the adjustment member has pressure relief holes corresponding to the ribs, respectively. Each of the pressure relief holes passes through a corresponding one of the ribs and a corresponding one of the deformation troughs.

Preferably, the ribs are elastic ribs.

Preferably, each of the ribs is disposed on the upper end surface of the elastic plate along a radial direction of the through hole.

Preferably, the respective inner ends of the ribs are located on an edge of the through hole of the elastic plate.

Preferably, a middle portion of the base is formed with a hollow cylinder placed inside the through hole of the elastic plate. A center of the hollow cylinder is provided with the influent hole.

Preferably, the upper cover has a conical shape. An upper end surface and a lower end surface of the upper cover are conical surfaces. The upper end surface of the elastic plate is a conical surface.

Preferably, a middle portion of the upper cover is provided with a sealing block facing the through hole.

Preferably, the upper cover is movably fitted in the mounting trough. A wall of the mounting trough is provided with an engaging flange to movably engage an edge of the upper cover.

Preferably, the aerator unit includes a water divider, a water outlet disc, a screen, and a main body. The main body is a cylinder having openings at upper and lower ends thereof. The upper and lower ends of the main body are provided with the water inlet and the water outlet, respectively. The water divider is a cover having an open top and a closed bottom. The water divider is fitted in the main body. The open top of the water divider communicates with the influent hole of the base. A side wall of the water divider is provided with a plurality of dividing holes communicating with an inner cavity of the main body. The water outlet disc is a perforated disc having a plurality of perforations. The water outlet disc is fitted in the main body and located below the water divider. The screen is fixed to an upper end surface of the water outlet disc. A side wall of the main body is provided with a plurality of vent holes along a circumferential direction thereof. The vent holes are higher than the water outlet disc and lower than the water divider.

Preferably, an inner wall of the main body is provided with a first annular groove, a first stopping edge protruding inwardly, a second stopping edge protruding inwardly and a second annular groove arranged sequentially from top to bottom. The base is provided with a first flange that is engaged with the first annular groove. The water divider is provided with a ledge protruding outwardly. The ledge is sandwiched between the first stopping edge and the base. The water outlet disc is provided with a second flange that is engaged with the second annular groove. The screen is sandwiched between the second flange and the water outlet disc.

Preferably, a lower end surface of the base is provided with an annular edge that protrudes downwardly and surrounds the influent hole. An outer wall of the annular edge is provided with a plurality of engaging bars. An inner wall of the water divider is provided with engaging grooves for engagement of the engaging bars.

By providing the flow regulator in the present invention, the present invention can automatically adjust the discharge area according to the change of the water pressure of the influent water flow to maintain the stability of the water outflow. When the water pressure of the influent water flow of the present invention becomes high, the influent water flow will push the upper cover downwards. Since the upper cover abuts against the ribs of the adjustment member, the upper cover moves downwards, and the elastic plate of the adjustment member is forcibly deformed so that the ribs are moved downwards. The discharge area of the water opening that communicates the water chamber with the influent hole becomes smaller, such that the flow of the water flowing into the aerator unit is stabilized so as to maintain the stability of the flow of the water discharged from the present invention.

When the water pressure of the influent water flow of the present invention becomes low, the elastic plate of the adjustment member is returned so that the ribs push the upper cover upwards. The discharge area of the water opening that communicates the water chamber with the influent hole becomes larger, such that the flow of the water flowing into the aerator unit is stabilized so as to maintain the stability of the flow of the water discharged from the present invention.

DETAILED DESCRIPTION OF THE PREFERRED EMBODIMENTS

Figure 1:
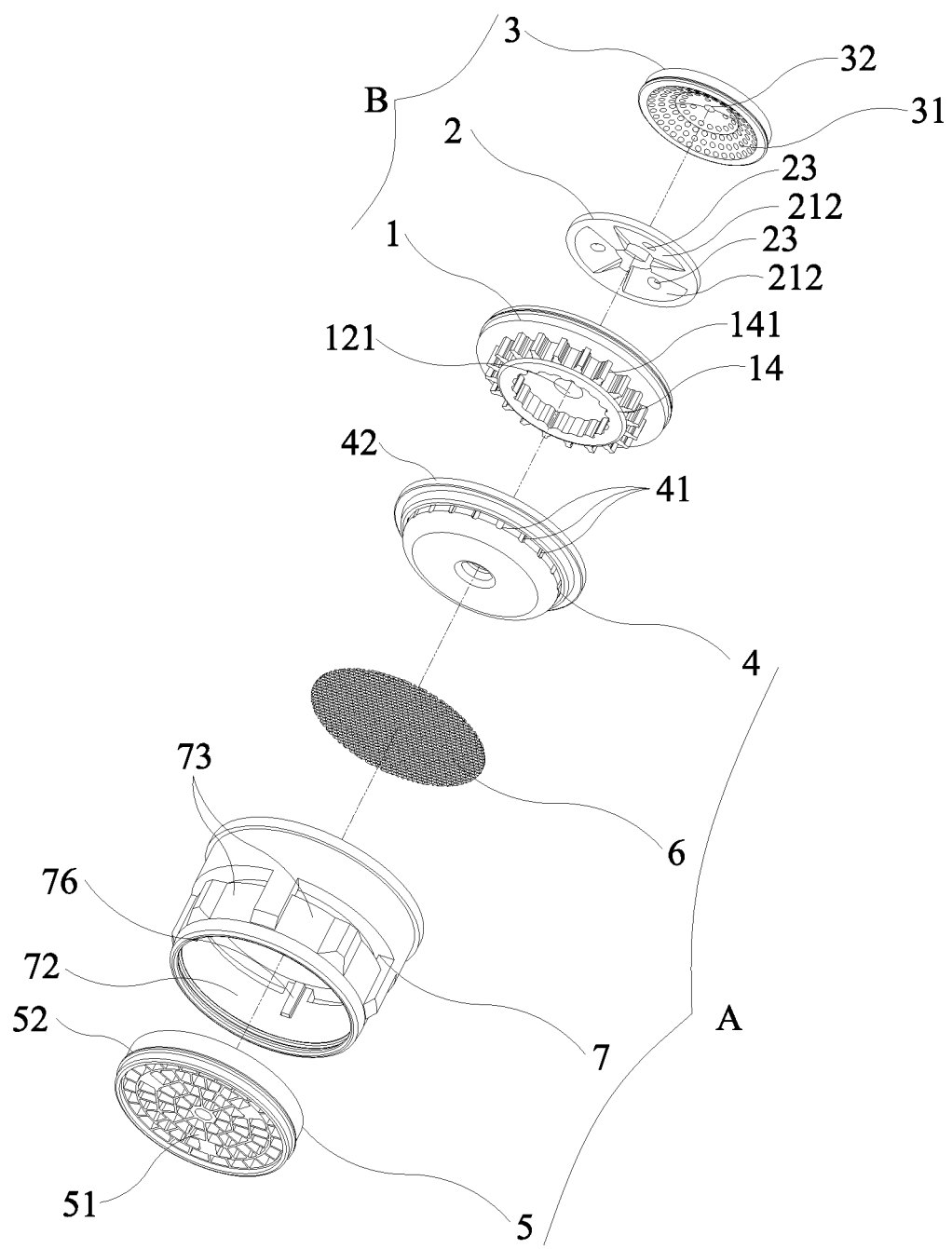
FIG. 1 is an exploded view of the present invention.

Embodiments of the present invention will now be described, by way of example only, with reference to the accompanying drawings.

As shown in FIG. 1 to FIG. 6, the present invention discloses a flow self-adjusting faucet aerator, comprising an aerator unit A. The upper and lower ends of the aerator unit A have a water inlet 71 and a water outlet 72, respectively.

The key of the present invention lies in that a flow regulator B is fitted in the water inlet 71 of the aerator unit A. As shown in FIG. 1 to FIG. 6, the flow regulator B includes a base 1, an adjustment member 2, and an upper cover 3. The base 1 is fitted into the water inlet 71. The base 1 is provided with a mounting trough 11 that is recessed downwardly. An influent hole 121 is provided in the center of the mounting trough 11. The adjustment member 2 includes an elastic plate 21 that abuts against the bottom of the mounting trough 11 and at least two ribs 22 that are disposed on the upper end surface of the elastic plate 21 and spaced apart from each other. The center of the elastic plate 21 is provided with a through hole 211 facing the influent hole 121. The lower end surface of the elastic plate 21 is provided with deformation troughs 212 that are recessed upwardly and correspond to the respective ribs 21 to provide a deformation space of the elastic plate 21 for downward movement of the ribs 22. The upper cover 3 is movably fitted in the mounting trough 11 and in contact with the ribs 22. The upper cover 3 is provided with a plurality of water inlet holes 31. Between every adjacent two of the ribs 22 in cooperation with the upper cover 3 and the elastic plate 21 is formed with a water chamber 221 communicating with the water inlet holes 31. Between the inner ends of the ribs 22 at two sides of the water chamber 221 in cooperation with the upper cover 3 and the elastic plate 21 is formed with a water opening 222 communicating with the water chamber 221 and the influent hole 121.

Figure 5:
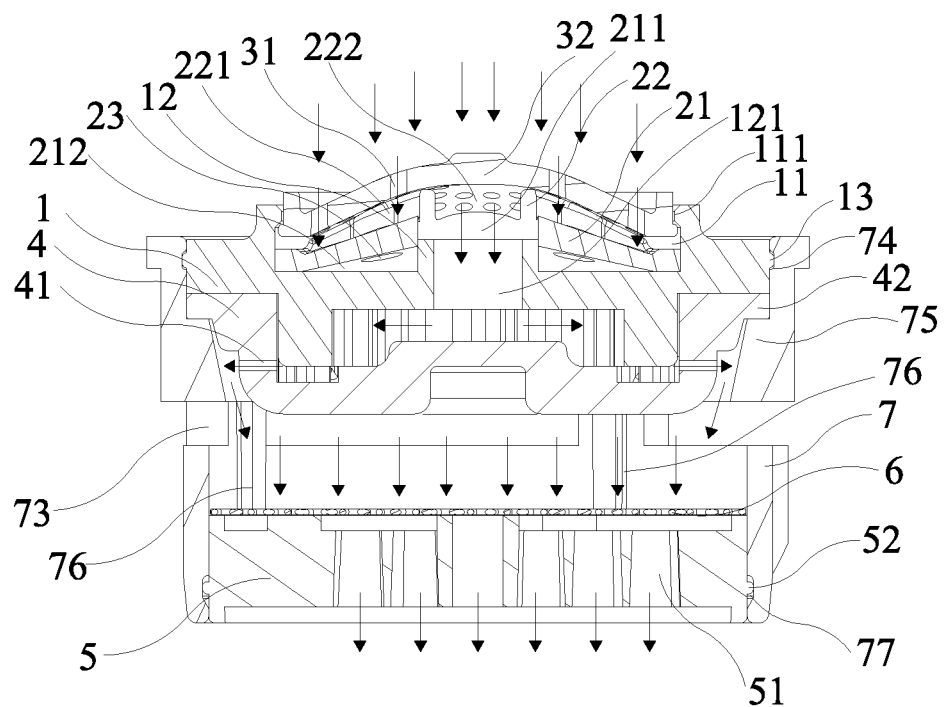
FIG. 5 is a first schematic view of the present invention when in use (the water pressure of the influent water flow is low)
Figure 6:
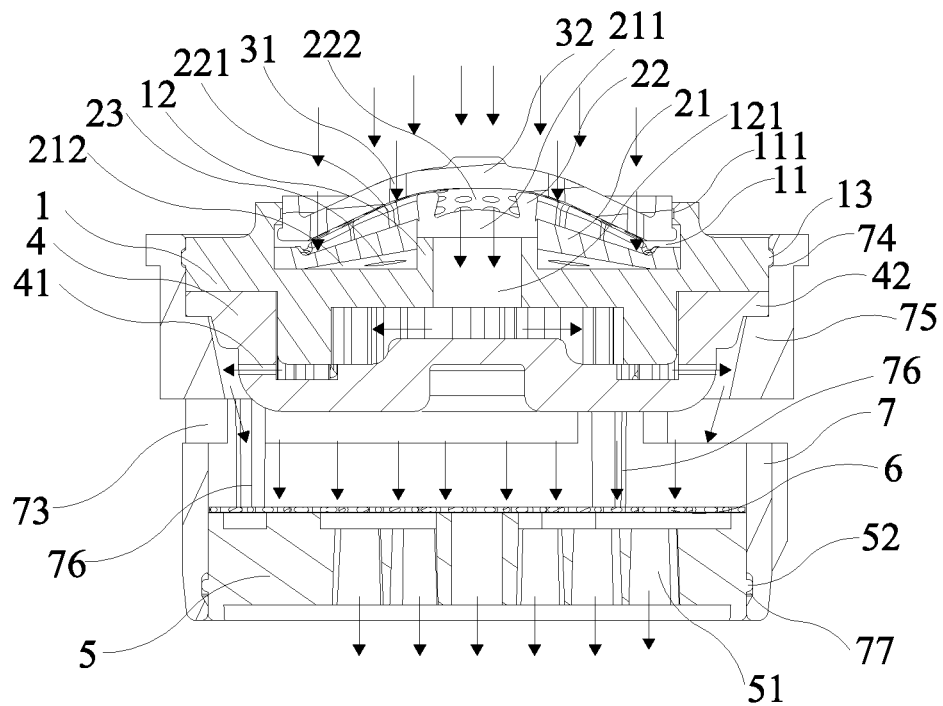
FIG. 6 is a second schematic view of the present invention when in use (the water pressure of the influent water flow is high).

With reference to FIG. 5 and FIG. 6, when the water pressure of the influent water flow of the present invention becomes high, the influent water flow will push the upper cover 3 downwards. Since the upper cover 3 abuts against the ribs 22 of the adjustment member 2, the upper cover 3 moves downwards. The elastic plate 21 of the adjustment member 2 is forcibly deformed so that the ribs 22 are moved downwards. The discharge area of the water opening 222 that communicates the water chamber 221 with the influent hole 121 becomes smaller. Further, the flow of the water flowing into the aerator unit A is stabilized so as to maintain the stability of the flow of the water discharged from the present invention. When the water pressure of the influent water flow of the present invention becomes low, the elastic plate 21 of the adjustment member 2 is returned so that the ribs 22 push the upper cover 3 upwards. The discharge area of the water opening 222 that communicates the water chamber 221 with the influent hole 121 becomes larger. Further, the flow of the water flowing into the aerator unit A is stabilized so as to maintain the stability of the flow of the water discharged from the present invention. Therefore, by setting the flow regulator B in the present invention, the present invention can automatically adjust the discharge area of the water opening 222 according to the change of the water pressure of the influent water flow to maintain the stability of the water outflow.

Specifically, as shown in FIG. 1, FIG. 2, FIG. 5 and FIG. 6, the upper cover 3 is movably fitted in the mounting trough 11. The wall of the mounting trough 11 is provided with an engaging flange 111 to movably engage the edge of the upper cover 3 so that the upper cover 3 is confined within the mounting trough 11 so as to prevent the upper cover 3 from falling off. The upper cover 3 may have a conical shape. Wherein, both the upper end surface and the lower end surface of the upper cover 3 are conical surfaces. Accordingly, the upper end surface of the elastic plate 21 may be a conical surface. The upper cover 3 may have a conical shape, which is beneficial for the upper cover 3 to withstand higher water pressure of the influent water flow. The middle portion of the upper cover 3 may be provided with a sealing block 32 facing the through hole 211. Through the sealing block 32, the influent water flow can be restricted from flowing into the influent hole 121 only through the water chamber 221.

Figure 2:
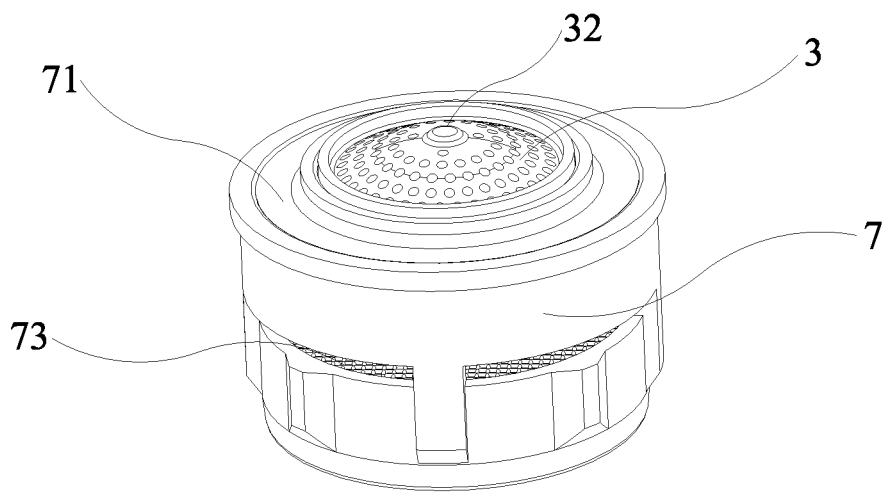
FIG. 2 is a perspective view of the present invention.
Figure 3:
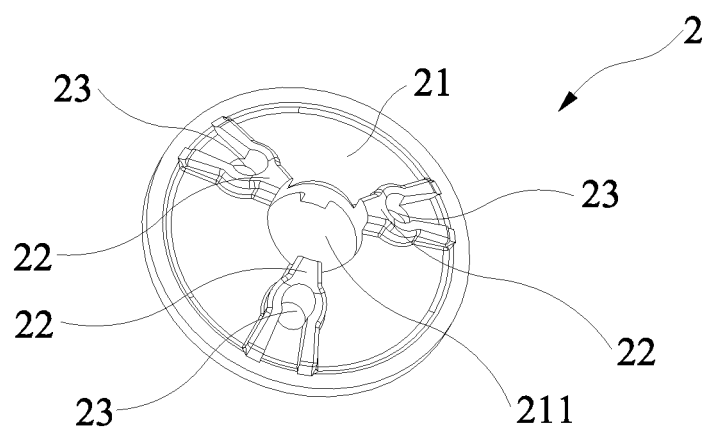
FIG. 3 is a first schematic view of the adjustment member of the present invention.
Figure 4:
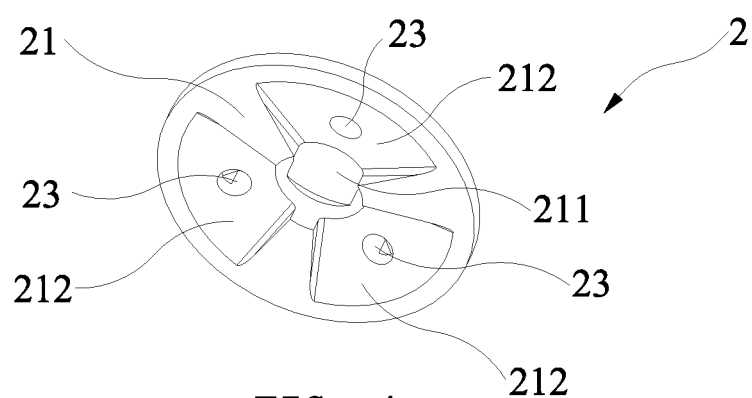
FIG. 4 is a second schematic view of the adjustment member of the present invention.

As shown in FIG. 2 to FIG. 4, the number of the ribs 22 on the adjustment member 2 may be three. Each of the ribs 22 may be disposed on the upper end surface of the elastic plate 21 along the radial direction of the through hole 211. The respective inner ends of the ribs 22 may be located on the edge of the through hole 211 of the elastic plate 21. The adjustment member 2 has pressure relief holes 23 corresponding to the ribs 22 respectively. Each of the pressure relief holes 23 passes through a corresponding one of the ribs 22 and a corresponding one of the deformation troughs 212. Through the pressure relief holes 23, it is possible to prevent the elastic plate 21 from being unable to be restored after being deformed.

In order to strengthen the adjustment ability of the present invention, the ribs 22 of the adjustment member 2 may be elastic ribs so that the ribs 22 have deformability. As shown in FIG. 5 and FIG. 6, when the water pressure of the influent water flow of the present invention becomes high, the influent water flow pushes the upper cover 3 downwards to move the ribs 22 downwards, and the upper cover 3 simultaneously presses the ribs 22 to deform the ribs 22 Thus, the discharge area of the water opening 222 that communicates the water chamber 221 with the influent hole 121 becomes smaller to maintain the stability of the flow of the water discharged from the present invention better. When the water pressure of the influent water flow of the present invention becomes low, the elastic plate 21 of the adjustment member 2 is restored so that the ribs 22 push the upper cover 3 upwards and the ribs 22 are also restored. Thus, the discharge area of the water opening 222 that communicates the water chamber 221 with the influent hole 121 becomes larger to maintain the stability of the flow of the water discharged from the present invention better.

As shown in FIG. 5, the middle portion of the base 1 is formed with a hollow cylinder 12 placed inside the through hole 211 of the elastic plate 21. The center of the hollow cylinder 12 is provided with the influent hole 121. The adjustment member 2 can be limited by the hollow cylinder 12 to avoid displacement of the adjustment member 2.

The aerator unit A may be various aerator units of the prior art. In order to facilitate the understanding of the present invention, a structure of the aerator unit A is provided below.

As shown in FIG. 1, FIG. 5 and FIG. 6, the aerator unit A includes a water divider 4, a water outlet disc 5, a screen 6, and a main body 7. The main body 7 is a cylinder having openings at upper and lower ends thereof. The upper and lower ends of the main body 7 are provided with the water inlet 71 and the water outlet 72, respectively. The water divider 4 is a cover having an open top and a closed bottom. The water divider 4 is fitted in the main body 7. The open top of the water divider 4 communicates with the influent hole 121 of the base 1. The side wall of the water divider 4 is provided with a plurality of dividing holes 41 communicating with an inner cavity of the main body 7. The water outlet disc 5 is a perforated disc having a plurality of perforations 51. The water outlet disc 5 is fitted in the main body 7 and located below the water divider 4. The screen 6 is fixed to the upper end surface of the water outlet disc 5. The side wall of the main body 7 is provided with a plurality of vent holes 73 along the circumferential direction thereof. The vent holes 73 are higher than the water outlet disc 5 and lower than the water divider 4. The inner wall of the main body 7 is provided with a first annular groove 74, a first stopping edge 75 protruding inwardly, a second stopping edge 76 protruding inwardly and a second annular groove 77 arranged sequentially from top to bottom. The base 1 is provided with a first flange 13 that is engaged with the first annular groove 74. The water divider 4 is provided with a ledge 42 protruding outwardly. The ledge 42 is sandwiched between the first stopping edge 75 and the base 1. The water outlet disc 5 is provided with a second flange 52 that is engaged with the second annular groove 77. The screen 6 is sandwiched between the second flange 76 and the water outlet disc 5.

In order to avoid that the water divider 4 rotates relative to the base 1, the lower end surface of the base 1 is provided with an annular edge 14 that protrudes downwardly and surrounds the influent hole 121. The outer wall of the annular edge 14 is provided with a plurality of engaging bars 141. The inner wall of the water divider 4 is provided with engaging grooves for engagement of the engaging bars 141.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A flow self-adjusting faucet aerator, comprising an aerator unit, upper and lower ends of the aerator unit having a water inlet and a water outlet respectively; a flow regulator being fitted in the water inlet of the aerator unit; the flow regulator including a base, an adjustment member and an upper cover; the base being fitted in the water inlet, the base being provided with a mounting trough that is recessed downwardly, an influent hole being provided in a center of the mounting trough; the adjustment member including an elastic plate that abuts against a bottom of the mounting trough and at least two ribs that are disposed on an upper end surface of the elastic plate and spaced apart from each other, a center of the elastic plate being provided with a through hole facing the influent hole, a lower end surface of the elastic plate being provided with deformation troughs that are recessed upwardly and correspond to the respective ribs; the upper cover being movably fitted in the mounting trough and in contact with the ribs, the upper cover being provided with a plurality of water inlet holes; between every adjacent two of the ribs in cooperation with the upper cover and the elastic plate being formed with a water chamber communicating with the water inlet holes; between inner ends of the ribs at two sides of the water chamber in cooperation with the upper cover and the elastic plate being formed with a water opening communicating with the water chamber and the influent hole;

wherein the adjustment member has pressure relief holes corresponding to the ribs respectively, and each of the pressure relief holes extending through a corresponding one of the ribs and a corresponding one of the deformation troughs.

2. The flow self-adjusting faucet aerator as claimed in claim 1, wherein the ribs are elastic ribs.

3. The flow self-adjusting faucet aerator as claimed in claim 1, wherein each of the ribs is disposed on the upper end surface of the elastic plate along a radial direction of the through hole.

4. The flow self-adjusting faucet aerator as claimed in claim 1, wherein the respective inner ends of the ribs are located on an edge of the through hole of the elastic plate.

5. The flow self-adjusting faucet aerator as claimed in claim 4, wherein a middle portion of the base is formed with a hollow cylinder placed inside the through hole of the elastic plate, and a center of the hollow cylinder is provided with the influent hole.

6. The flow self-adjusting faucet aerator as claimed in claim 1, wherein the upper cover has a conical shape, an upper end surface and a lower end surface of the upper cover are conical surfaces, and the upper end surface of the elastic plate is a conical surface.

7. The flow self-adjusting faucet aerator as claimed in claim 1, wherein a middle portion of the upper cover is provided with a sealing block facing the through hole.

8. The flow self-adjusting faucet aerator as claimed in claim 1, wherein the upper cover is movably fitted in the mounting trough, a wall of the mounting trough is provided with an engaging flange to movably engage an edge of the upper cover.

9. The flow self-adjusting faucet aerator as claimed in claim 1, wherein the aerator unit includes a water divider, a water outlet disc, a screen, and a main body; the main body is a cylinder having openings at upper and lower ends thereof, the upper and lower ends of the main body are provided with the water inlet and the water outlet respectively; the water divider is a cover having an open top and a closed bottom, the water divider is fitted in the main body, the open top of the water divider communicates with the influent hole of the base; a side wall of the water divider is provided with a plurality of dividing holes communicating with an inner cavity of the main body; the water outlet disc is a perforated disc having a plurality of perforations, the water outlet disc is fitted in the main body and located below the water divider; the screen is fixed to an upper end surface of the water outlet disc, a side wall of the main body is provided with a plurality of vent holes along a circumferential direction thereof, and the vent holes are higher than the water outlet disc and lower than the water divider.

10. The flow self-adjusting faucet aerator as claimed in claim 9, wherein an inner wall of the main body is provided with a first annular groove, a first stopping edge protruding inwardly, a second stopping edge protruding inwardly and a second annular groove arranged sequentially from top to bottom; the base is provided with a first flange that is engaged with the first annular groove; the water divider is provided with a ledge protruding outwardly, the ledge is sandwiched between the first stopping edge and the base; the water outlet disc is provided with a second flange that is engaged with the second annular groove; and the screen is sandwiched between the second flange and the water outlet disc.

11. The flow self-adjusting faucet aerator as claimed in claim 9, wherein a lower end surface of the base is provided with an annular edge that protrudes downwardly and surrounds the influent hole, an outer wall of the annular edge is provided with a plurality of engaging bars, and an inner wall of the water divider is provided with engaging grooves for engagement of the engaging bars.

* * * * *